(12) United States Patent
Billington et al.

(10) Patent No.: US 9,632,582 B2
(45) Date of Patent: Apr. 25, 2017

(54) MAGNETIC SUSPENSION SYSTEM FOR TOUCH SCREENS AND TOUCH SURFACES

(71) Applicant: Immersion Corporation, San Jose, CA (US)

(72) Inventors: Douglas Billington, Campbell, CA (US); Elena Redelsheimer, Milpitas, CA (US); William Rihn, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 95 days.

(21) Appl. No.: 14/580,161

(22) Filed: Dec. 22, 2014

(65) Prior Publication Data

US 2016/0179200 A1    Jun. 23, 2016

(51) Int. Cl.
| | |
|---|---|
| *G06F 3/01* | (2006.01) |
| *G06F 1/16* | (2006.01) |
| *G06F 3/041* | (2006.01) |

(52) U.S. Cl.
CPC .............. *G06F 3/016* (2013.01); *G06F 1/163* (2013.01); *G06F 3/041* (2013.01)

(58) Field of Classification Search
CPC ........................................................ G06F 3/016
See application file for complete search history.

(56) References Cited

U.S. PATENT DOCUMENTS

| | | |
|---|---|---|
| 3,128,999 A | 4/1964 | Schmitt |
| 4,556,130 A | 12/1985 | Puszakowski |
| 5,335,893 A | 8/1994 | Opp |

(Continued)

FOREIGN PATENT DOCUMENTS

| | | |
|---|---|---|
| CN | 101675411 A | 3/2010 |
| CN | 101803052 A | 8/2010 |

(Continued)

OTHER PUBLICATIONS

"Correlated Magnetics Research Programmable Magnetics", Correlated Magnetics Research, Apr. 1, 2014.

(Continued)

*Primary Examiner* — Larry Sternbane
*Assistant Examiner* — Maheen Javed
(74) *Attorney, Agent, or Firm* — Medler Ferro Woodhouse & Mills PLLC

(57) ABSTRACT

A magnetic suspension system is disclosed for use in mounting an electronic touch screen. The magnetic suspension system may be designed to provide more or less movement in any direction, i.e., along the x-axis, the y-axis, and/or the z-axis, depending upon the application. The magnetic suspension system includes a first programmable magnet coupled to a first body and a second programmable magnet coupled to a second body. The programmable magnets simultaneously repel and attract each other in a nominal configuration such that the second body is suspended a programmed spaced-apart distance from the first body. The programmable magnets also allow movement between the first and second bodies in reaction to a force applied to the second body by a haptic actuator with a programmed spring force such that the first and second bodies return to the nominal configuration when no force is applied to the second body.

17 Claims, 10 Drawing Sheets

(56) References Cited

U.S. PATENT DOCUMENTS

| | | |
|---|---|---|
| 5,419,626 A | 5/1995 | Crockett |
| 5,568,357 A | 10/1996 | Kochis et al. |
| 5,594,574 A | 1/1997 | Lara et al. |
| 5,751,551 A | 5/1998 | Hileman et al. |
| 5,765,819 A | 6/1998 | Hummel |
| 5,965,249 A | 10/1999 | Sutton et al. |
| 6,283,859 B1 | 9/2001 | Carlson et al. |
| 6,744,903 B1 | 6/2004 | Jeon |
| 6,822,635 B2 | 11/2004 | Shahoian et al. |
| 6,879,318 B1 | 4/2005 | Chan et al. |
| 6,882,528 B2 | 4/2005 | Chuang |
| 6,975,305 B2 | 12/2005 | Yamashita |
| 7,267,313 B2 | 9/2007 | Krzoska et al. |
| 7,616,436 B2 | 11/2009 | DeMoss et al. |
| 7,633,745 B2 | 12/2009 | Sakakibara et al. |
| 7,835,147 B2 | 11/2010 | Merz et al. |
| 7,839,639 B2 | 11/2010 | Najbert |
| 8,059,105 B2 | 11/2011 | Rosenberg et al. |
| 8,061,673 B2 | 11/2011 | Yao |
| 8,068,337 B2 | 11/2011 | Yao et al. |
| 8,362,882 B2 | 1/2013 | Heubel et al. |
| 8,629,954 B2 | 1/2014 | Olien et al. |
| 9,174,134 B1 | 11/2015 | Grant et al. |
| 2002/0180712 A1 | 12/2002 | Sato et al. |
| 2003/0206202 A1 | 11/2003 | Moriya |
| 2004/0160422 A1 | 8/2004 | Choi et al. |
| 2006/0022952 A1 | 2/2006 | Ryynanen |
| 2006/0023416 A1 | 2/2006 | Chen |
| 2006/0109254 A1 | 5/2006 | Akieda et al. |
| 2006/0181517 A1 | 8/2006 | Zadesky et al. |
| 2007/0298877 A1* | 12/2007 | Rosenberg ............ A63F 13/06 463/30 |
| 2008/0055277 A1 | 3/2008 | Takenaka et al. |
| 2008/0060856 A1 | 3/2008 | Shahoian et al. |
| 2008/0111788 A1 | 5/2008 | Rosenberg et al. |
| 2008/0297328 A1 | 12/2008 | Crawford et al. |
| 2009/0015549 A1 | 1/2009 | Gelfond et al. |
| 2010/0045612 A1 | 2/2010 | Molne |
| 2010/0117809 A1 | 5/2010 | Dai et al. |
| 2010/0127140 A1 | 5/2010 | Smith |
| 2010/0172080 A1 | 7/2010 | Bestle |
| 2010/0245254 A1 | 9/2010 | Olien et al. |
| 2011/0032091 A1 | 2/2011 | Park et al. |
| 2011/0043454 A1 | 2/2011 | Modarres et al. |
| 2011/0053653 A1 | 3/2011 | Tho et al. |
| 2011/0080350 A1 | 4/2011 | Almalki et al. |
| 2011/0164365 A1 | 7/2011 | McClure et al. |
| 2011/0227849 A1 | 9/2011 | Olien et al. |
| 2011/0248817 A1 | 10/2011 | Houston et al. |
| 2011/0291996 A1 | 12/2011 | Gao et al. |
| 2012/0206248 A1 | 8/2012 | Biggs |
| 2012/0319827 A1* | 12/2012 | Pance ............... G06F 3/016 340/407.1 |
| 2013/0044049 A1 | 2/2013 | Biggs et al. |
| 2013/0100607 A1 | 4/2013 | Ternus et al. |
| 2014/0028573 A1 | 1/2014 | Olien et al. |
| 2014/0125471 A1 | 5/2014 | Organ et al. |
| 2014/0175703 A1 | 6/2014 | Percival et al. |
| 2016/0175703 A1 | 6/2016 | Venkatesan et al. |

FOREIGN PATENT DOCUMENTS

| | | | |
|---|---|---|---|
| CN | 102221889 | 10/2011 | |
| CN | 202094851 | 12/2011 | |
| CN | WO 2014134962 A1 * | 9/2014 | ........... G06F 3/0202 |
| DE | 20019074 U1 | 2/2001 | |
| EP | 1 691 263 | 8/2006 | |
| JP | 2006/048453 | 2/2006 | |
| JP | 2012-108402 | 6/2012 | |
| WO | 2004/081776 | 9/2004 | |
| WO | 2010/116962 | 10/2010 | |
| WO | 2012/002664 | 1/2012 | |
| WO | 2012/067370 | 5/2012 | |

OTHER PUBLICATIONS

Extended European Search Report, EP Application No. 15 19 8223.8 (IMM 544.EP), Apr. 21, 2016.

Extended European Search Report, EP Application No. 15 192 075.8 (IMM545.EP), Jun. 1, 2016.

Office Action for CN Application No. 2013800088321, dated Oct. 18, 2016.

Notice of Allowance for U.S. Appl. No. 14/580,177, dated Oct. 21, 2016.

* cited by examiner

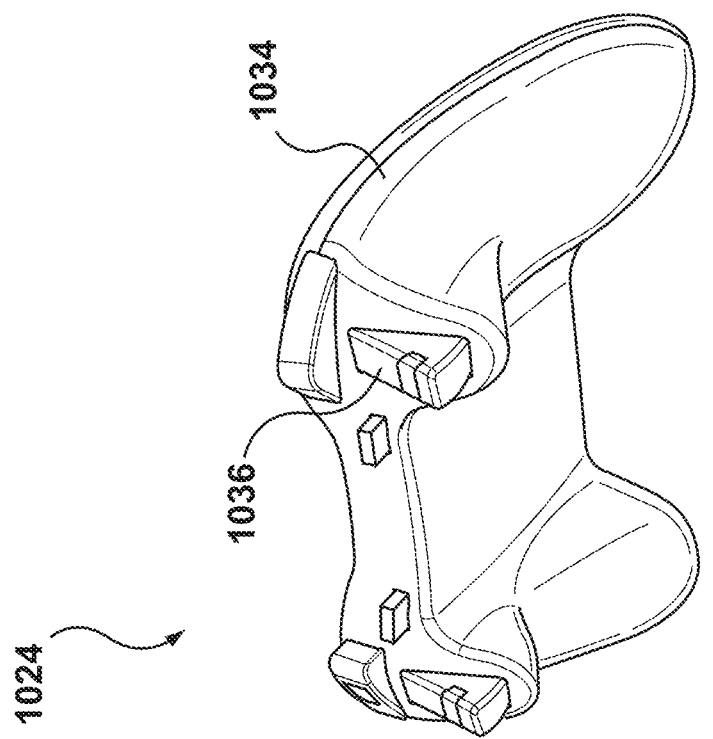
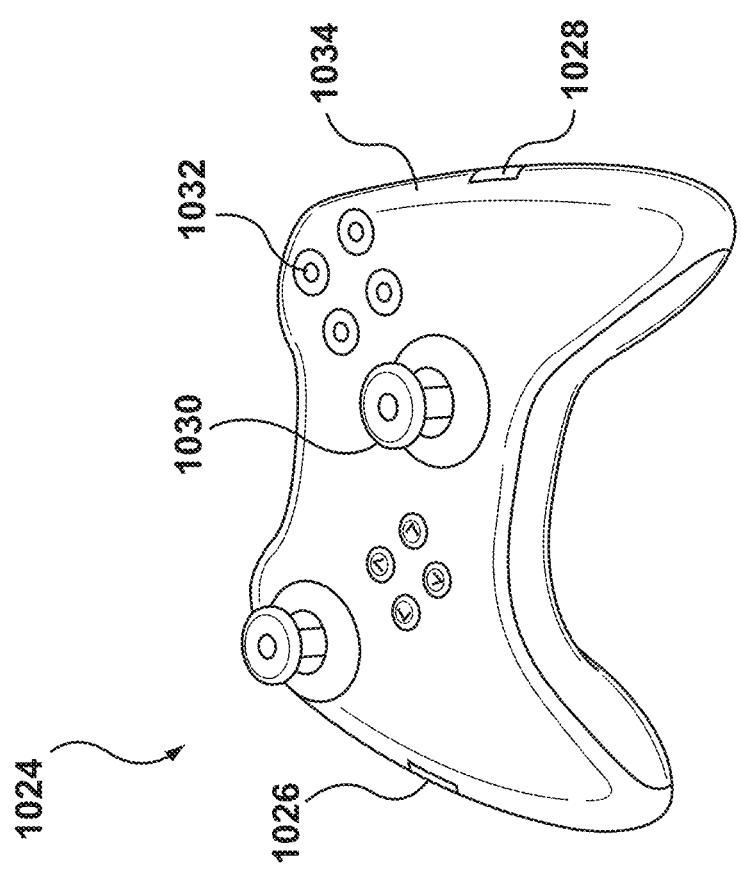
FIG. 10B
FIG. 10A

MAGNETIC SUSPENSION SYSTEM FOR TOUCH SCREENS AND TOUCH SURFACES

FIELD OF THE INVENTION

The present invention relates generally to components and/or systems which provide haptic feedback to the user, and more particularly to touch screens and touch surfaces which provide haptic feedback to the user.

BACKGROUND OF THE INVENTION

New generation consumer devices increasingly rely on touch screen inputs such as virtual buttons and sliders displayed on a screen as an alternative to physical inputs. Users may interface with such devices almost exclusively by touching and/or otherwise manipulating the virtual buttons, sliders, scrollers, and the like on the screen with one or more finger(s). Graphic displays on the screen provide visual feedback responsive to such manipulation. In some more recent touch screen devices, force feedback or tactile feedback, commonly collectively known as haptic feedback, can also be provided to a user as the user's fingers interact with virtual objects on the touch screen. This is accomplished generally by moving or vibrating the screen with a haptic actuator coupled to the screen.

To allow the haptic touch screen to move in response to the haptic actuator and thereby to isolate a haptic effect to the screen, haptic touch screens have been compliantly suspended within electronic devices in which they reside. It is important, however, that, even though the screen must be able to move when the haptic actuator is activated, the suspended screen must nevertheless feel to a user as if it were substantially rigidly mounted when touched. Others have addressed the problem by not using a suspension, but not using a suspension limits the mass of the system that can have haptic effects.

Suspensions utilizing compliant grommet for mounting touch screens and touch surfaces within a housing are known, as illustrated in U.S. Pat. No. 8,629,954 to Olien et al., herein incorporated by reference in its entirety. More particularly, FIG. 1 reproduced from Olien et al. illustrates an exploded view of various components of an electronic touch screen system 100 for providing haptic feedback to a touch screen 102 that utilizes a plurality of grommet suspension elements 104 in a mechanical suspension system. In addition to touch screen 102, touch screen system 100 includes a carrier 106, a motor or haptic actuator 108, a dust seal 110, an LCD component 112, and a main housing component 114. Grommet suspension elements 104 are configured to allow preferential movement of touch screen 102 along a certain axis, such as along an x-axis, while limiting movement in other directions, such as along a y-axis or a z- axis.

In addition to compliant grommet components, other suspensions have been proposed for touch screen applications as illustrated in U.S. Pat. No. 8,059,105 to Rosenberg et al., herein incorporated by reference in its entirety, and U.S. Patent Pub. No. 2010/0245254 A1 to Olien et al, herein incorporated by reference in its entirety. FIG. 2, which is reproduced from Rosenberg et al., illustrates a touch screen system 200 having one or more spring elements 204 coupled between a touchpad or touch screen 202 and a main housing component 214. Spring elements 204 are shown as helical or coiled elements, but may be a compliant material such as rubber, foam, or flexures. Spring elements 204 couple touch screen 202 to the rigid housing 214 of system 200 and allow touch screen 202 to be moved along the z-axis. In the embodiment of FIG. 2, one or more piezoelectric actuators 208 are coupled to the underside of a touch screen 202 and serve to output a small pulse, vibration, or texture sensation onto touch screen 202 and to the user if the user is contacting the touch screen.

A need exists in the art for improved and/or alternative suspension systems for haptic touch screens.

SUMMARY OF THE INVENTION

Embodiments hereof are directed to a haptic device including a first body, a second body, a haptic actuator for moving the second body relative to the first body and thereby provide a haptic effect to a user of the second body, and at least one magnetic suspension system that couples the first and second bodies together such that the second body is movable relative to the first body. The magnetic suspension system includes a first programmable magnet coupled to the first body and a second programmable magnet coupled to the second body. The first and second programmable magnets are configured to simultaneously repel and attract each other in a nominal configuration such that the second body is suspended a programmed spaced-apart distance from the first body. The first and second programmable magnets are also configured to allow movement between the first body and the second body in reaction to a force applied to the second body by the haptic actuator in at least a first direction with a programmed spring force such that the first and second bodies return to the nominal configuration when no force is applied to the second body.

According to another embodiment hereof, a haptic device has a magnetic suspension system includes a housing component, a touch screen, a haptic actuator for moving the touch screen relative to the housing component and thereby provide a haptic effect to a user of the touch screen, and at least one magnetic suspension system that couples the touch screen and housing components together such that the touch screen is movable relative to the housing component. The magnetic suspension system includes a first programmable magnet coupled to the housing component and a second programmable magnet coupled to the touch screen. The first and second programmable magnets are configured to simultaneously repel and attract each other in a nominal configuration such that the touch screen is suspended a programmed spaced-apart distance from the housing component. The first and second programmable magnets are also configured to allow movement between the housing component and the touch screen in reaction to a force applied to the touch screen by the haptic actuator in at least a first direction with a programmed spring force such that the touch screen and housing component return to the nominal configuration when no force is applied to the touch screen.

According to another embodiment hereof, a haptic device includes a housing component, a trigger rotatable with respect to the housing component, and at least one magnetic suspension system including a first programmable magnet coupled to the housing component and a second programmable magnet coupled to the trigger. The first and second programmable magnets are configured to simultaneously repel and attract each other in a nominal configuration such that the trigger is suspended a programmed spaced-apart distance from the housing component. The first and second programmable magnets are also configured to allow rotation of the trigger with respect to the housing component in at least a first direction with a programmed spring force such that the trigger returns to the nominal configuration when no force is applied to the trigger.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 10A is a perspective view of a controller, the controller including a magnetic suspension system for suspending a user input element thereof according to another embodiment hereof FIG. 10B is another perspective view of the controller of FIG. 10A.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Although descriptions of embodiments hereof are in the context of a suspension system for an electronic touch screen, the invention may also be used in any other applications where it is deemed useful. Furthermore, there is no intention to be bound by any expressed or implied theory presented in the preceding technical field, background, brief summary or the following detailed description.

Embodiments hereof are directed to a magnetic suspension system for mounting touch screens and touch surfaces. The magnetic suspension system will be described below within the context of a touch screen wherein a graphical display is disposed behind a touch surface or touch element. It will be understood, however, that the invention is not limited to suspensions for such touch screens but is equally applicable to any haptically excited touch surface or touch element. For example, the suspension system might be applied to suspend the touch pad of a computer wherein the display screen is not co-located with the touch pad. It may be applied to suspend a touch element with at least one touch sensitive region or an array of touch sensitive regions that may be created by capacitive sensors, near field effect sensors, piezo sensors, or other sensor technology. The graphical element may be a display located behind or in a separate location from the touch element and updated by a host computer, or it may simply be a plastic surface with features (e.g., graphics) indicating touch sensitive regions of an associated touch element. Thus, the term touch screen when used in the following detailed description and in the claims should be construed to encompass traditional touch screens as well as any touch surface or touch element and associated graphical element to which haptic effects may be applied.

Figure 1:
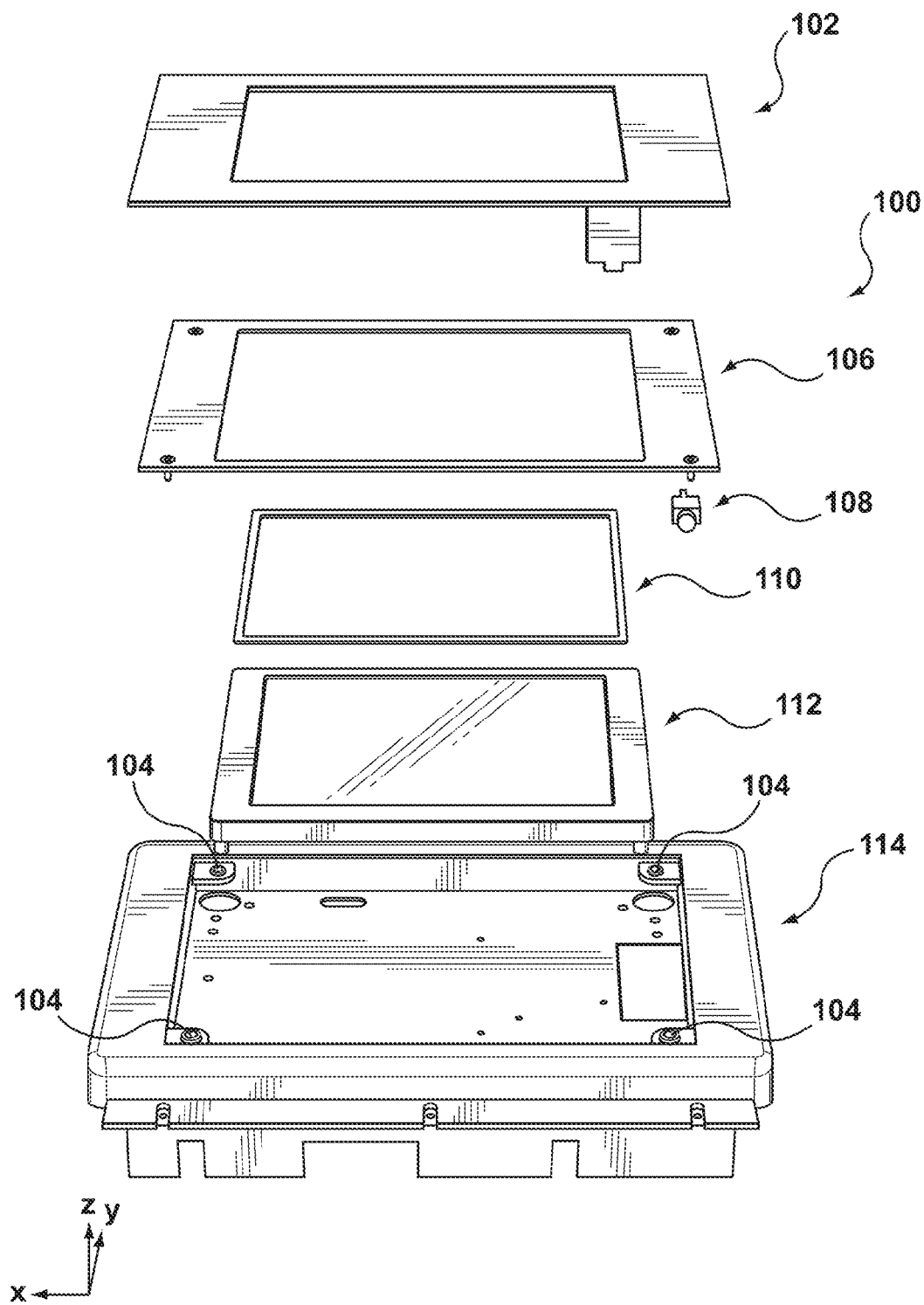
FIG. 1 is an exploded perspective view illustrating various components of a prior art haptic device for providing haptic feedback, wherein grommets are utilized for suspension.
Figure 2:
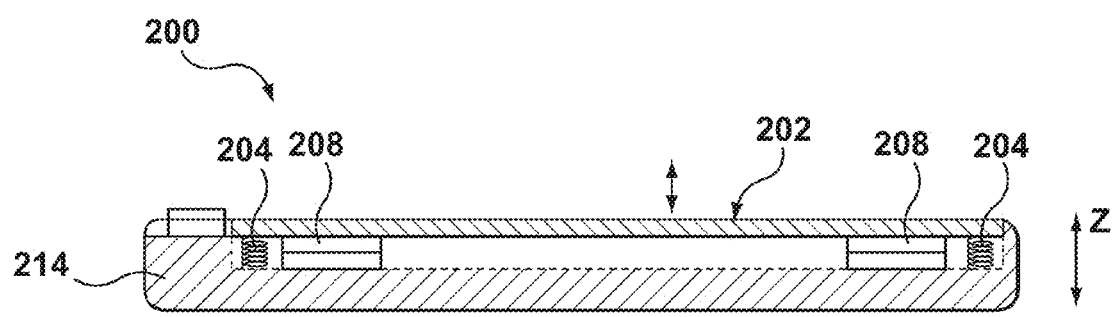
FIG. 2 is a side view of a prior art haptic device for providing haptic feedback, wherein springs are utilized for suspension.
Figure 3:
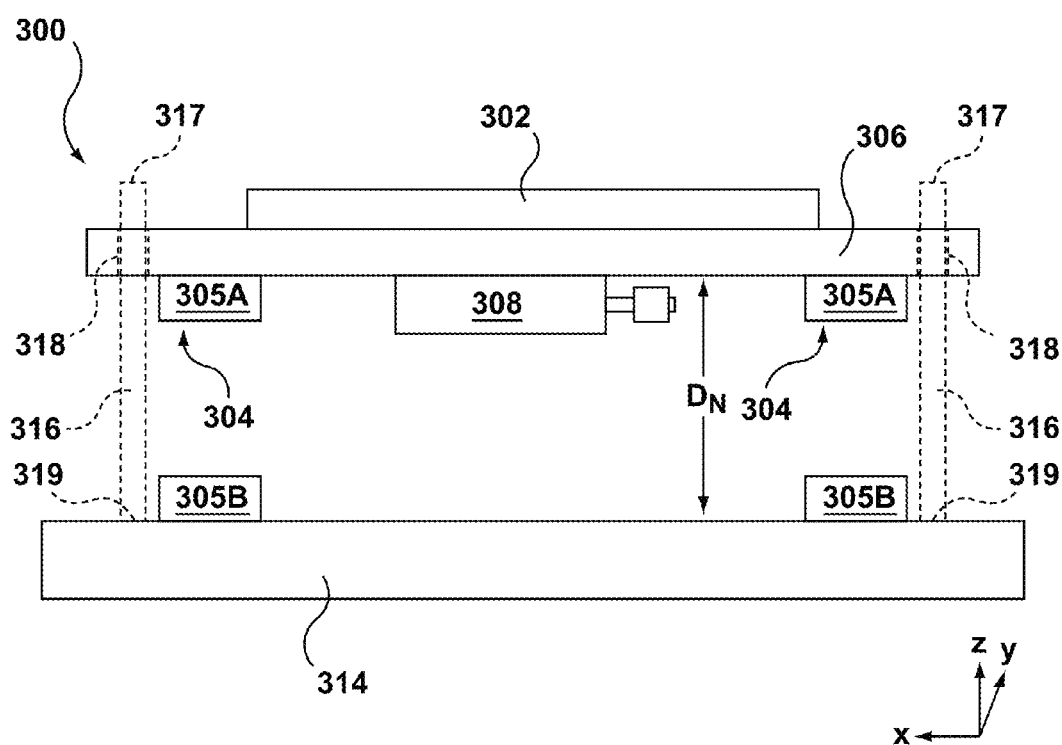
FIG. 3 is a side view of a haptic device according to an embodiment hereof, the haptic device including a plurality of magnetic suspension systems for suspending a touch screen above a housing component along the z-axis, wherein the magnetic suspension systems are shown in their nominal configurations with no force applied thereto.

Embodiments hereof are directed to a haptic device having a magnetic suspension system. More particularly, FIG. 3 illustrates a haptic device 300 that includes a touch surface or screen 302, a housing or base component 314, a haptic actuator 308 for providing a haptic effect to a user of touch screen 302, and a plurality of magnetic suspension systems 304 that couple touch screen 302 and housing component 314 together such that the touch screen is movable relative to the housing component. A carrier or mounting component 306 is coupled to an underside surface of touch screen 302. For purposes of this disclosure, after touch screen 302 is attached to mounting component 306, the mounting component 306 may be considered an integral element or component of the touch screen. Carrier or mounting component 306 is formed from a sheet metal such as steel or aluminum, or a plastic material such as polycarbonate or PC-ABS. Main housing 314 is generally considered to be a compartment or casing, but may be any type of base component. In an embodiment, haptic device 300 is a medical device with a seven inch touch screen display, for instance. In another embodiment, haptic device 300 is an automobile console panel with a control touchpad or touch screen. Haptic device 300 may be any of a number of devices having an automotive interface (i.e., touch screen, touch pad, or touch panel) such as, for instance, a computer, cellular telephone, PDA, portable gaming device, media player, a printer, an office telephone, or the like. Haptic actuator 308 is coupled to an underside surface of mounting component 306, and is thereby coupled to touch screen 302, and may be any of a number of known actuator types including, without limitation, a piezo actuator, voice coil actuator, an eccentric mass actuator, an E-core type actuator, a solenoid, a moving magnet actuator, or other type of actuator as desired. It will be understood by one of ordinary skill in the art that the placement of haptic actuator 308 may vary from that shown and is not limited to the location shown in FIG. 3. Software is used to provide haptic feedback to the user of haptic device 300. In an embodiment, touch screen 302 can display a graphical environment based on application programs and/or operating systems that are running, such as a graphical user interface (GUI). The graphical environment may include, for example, backgrounds, windows, data listings, a cursor, icons such as buttons, and other graphical objects well known in GUI environments. A user interacts with haptic device 300 by touching various regions of touch screen 302 to activate, move, flip, advance, or otherwise manipulate the virtual graphical objects displayed on the screen, and thereby to provide inputs to the device. Such touch screens and GUIs are well known, as exemplified in U.S. Pat. No. 8,059,105 to Rosenberg et al. incorporated by reference above. Although not shown, haptic device 300 may also include an LCD component (not shown) fixed to main housing component 314 in any suitable manner with a dust seal (not shown) installed to prevent dust intrusion between touch screen 302 and the LCD component.

In the embodiment of FIG. 3, four discrete but identical magnetic suspension systems 304 couple touch screen 302 and housing component 314 at the corners of the haptic device but it will be understood by those of ordinary skill in the art that more magnetic suspension systems may be utilized, or less magnetic suspension system may be utilized. For example, in another embodiment hereof (not shown), the haptic device may include a plurality of discrete magnetic suspension systems extending between touch screen 302 and housing component 314 at strategic locations such as but not limited along a centerline of the haptic device, along one or more edges of the haptic device, and/or adjacent to haptic actuator(s). In yet another embodiment hereof (not shown), only one magnetic suspension system may extend continuously under all or a portion of touch screen.

Touch screen 302 of haptic device 300 may be considered a haptic touch screen in that it is provided with haptic actuator 308 and associated control hardware and software that provide signals to the actuator causing it to induce desired motion of touch screen 302 in coordination with the user's touches. A signal may be provided to, for example, induce a jolt in conjunction with a virtual button press or collisions between virtual elements, or vibrations in conjunction with movement of virtual elements across the screen, or other types of screen movements as described in more detail in U.S. Pat. No. 8,059,105 to Rosenberg et al. incorporated by reference above. Such haptic feedback or effects, also known as tactile feedback, touch feedback, and vibro-tactile feedback, allows for a more intuitive, engaging, and natural experience for the user of haptic device 300 and thus interaction between the user and haptic device 300 is considerably enhanced through the tactile feedback provided by the haptic effects.

In this embodiment, the forces produced or output by actuator 308 onto touch screen 302 are linear and along the z-axis, which is perpendicular or normal to the planar surface of the touch screen 302. In order to allow a user to feel the forces produced or output by actuator 308, magnetic suspension systems 304 in accordance with embodiments hereof are installed to allow touch screen 302 to have the required compliance for haptic feedback and be moved by the forces output by actuator 308. However, when the user applies forces to touch screen 302 during operation thereof, allowing movement or travel of the touch screen in other directions may feel fragile or instable to the user. Stated another way, although it is desirable to allow movement of the touch screen during haptic feedback, it is not desirable to allow movement of the touch screen during user operation or control thereof. In order to provide a desired haptic effect, magnetic suspension systems in accordance with embodiments hereof are configured to allow preferential movement of touch screen 302 with respect to housing component 314 in a certain direction or along a certain translational axis, such as an z-direction or axis, while limiting or restricting movement in other directions or along other translational axis, such as the y-direction or axis and x-direction or axis, when installed within haptic device 300. With reference to the coordinate system shown in FIG. 3, magnetic suspension systems 304 are shown configured to allow travel of touch screen 302 in the direction of the z-axis and to limit or restrict travel in the direction of the y-axis and/or x-axis. In other embodiments hereof, as will be described in more detail below, magnetic suspension systems 304 is programmed or configured to allow travel of touch screen 302 in a direction of the y-axis and/or x-axis, and/or to limit or restrict travel in the direction of the z-axis to allow a touch screen to move in the direction of the desired haptic effect but be very rigid in other directions.

Figure 6A:
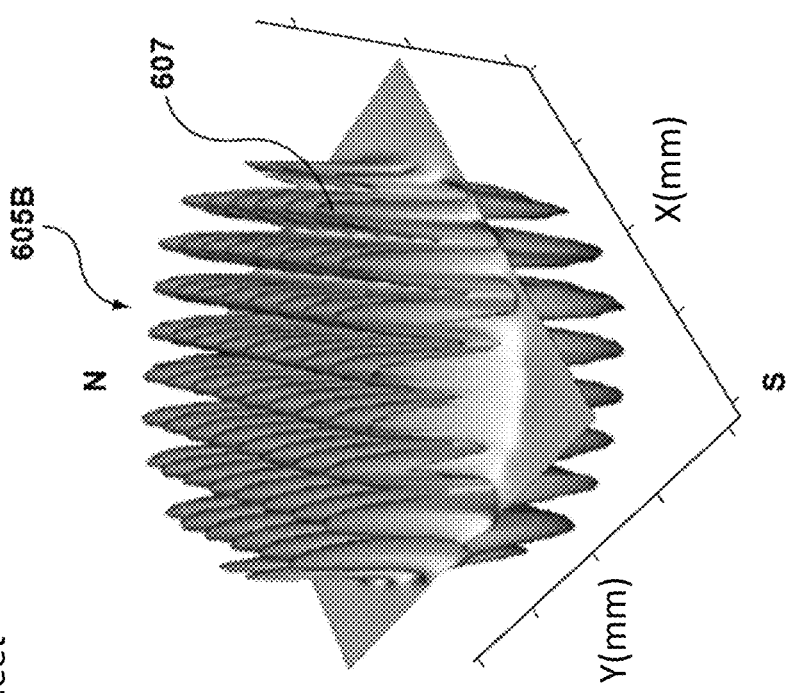
FIG. 6A is a perspective view of a conventional magnet.
Figure 6B:
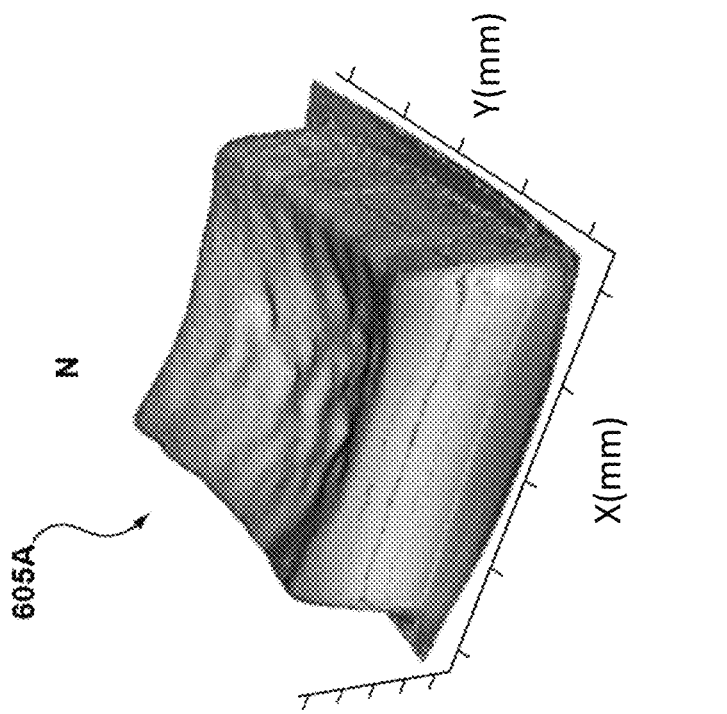
FIG. 6B is a perspective view of a programmable magnet.

Each magnetic suspension system 304 includes a first programmable magnet 305A attached to touch screen 302 (via mounting component 306) and a second programmable magnet 305B attached to housing component 314. First and second programmable magnets 305A, 305B are each programmable magnets including multiple magnetic elements of various strength and polarity on a single substrate. More particularly, a conventional magnet 605A is shown in FIG. 6A while an exemplary programmable magnet 605B is shown in FIG. 6B. Conventional magnet 605A is a single or individual magnetic element having a singular polarity and strength, while programmable magnet 605B includes a plurality of magnetic elements 607 of various strength and polarity. When a pair of programmable magnets oppose or face each other such that the magnetic elements thereon oppose or face each other, the corresponding opposing magnetic elements form pre-programmed correlated patterns designed to achieve a desired behavior. The programmable behavior is achieved by creating multipole structures comprising multiple magnetic elements of varying size, location, orientation, and saturation. The exemplary embodiment of FIG. 6B illustrates a programmable magnet having sixty-six magnetic elements 607 on a single or individual surface or substrate, although the particular number of magnetic elements is exemplary and for use of illustration only and may be varied according to application. Each magnetic element 607 has the same strength and polarity in FIG. 6B, but the magnetic strength and polarity of any magnetic element 607 can each be varied to achieve a desired behavior. Thus, programmable magnets are programmable in the sense that the magnetic strength and polarity of any magnetic element 607 is designed or selected in order to achieve a desired behavior. However, the programmable aspect or nature of the magnet is complete after the programmable magnet is formed with a plurality of magnetic elements 607 of various strength and polarity, and thus the programmable magnets may be considered to be "one-time" programmable magnets. Programmable magnets are commercially available from Correlated Magnetics Research LLC of Huntsville, Ala.

Referring back to FIG. 3, first and second programmable magnets 305A, 305B are programmed to attract and repel each other at the same time with a programmed force or strength. By programming different magnetic elements to have different strengths and direction of poles at different parts of the magnet, touch screen 302 is "suspended" magnetically above housing component 314 such that the touch screen floats above the housing component with a programmed spring force or damping. As such, magnetic suspension systems 304 are configured to or programmed such that touch screen 302 floats or hovers a controlled or programmed spaced-apart distance from housing component 314 in a nominal configuration. Magnetic suspension systems 304 are also configured or programmed to allow movement between housing component 314 and touch screen 302 in reaction to a force applied to the touch screen by haptic actuator 308 with a controlled or programmed spring force such that housing component 314 and touch screen 302 return to the nominal configuration when no force is applied to touch screen 302. The nominal configuration of haptic device 300 is shown in FIG. 3, with touch screen 302 being suspended a controlled or programmed distance $D_N$ from housing component 314. As used herein, controlled or programmed spaced-apart distance means that touch screen 302 is located or disposed relative to housing component 314 such that a space or gap exists between the housing component and touch screen which do not contact or touch each other, and the measurement size of the distance is a programmable feature or characteristic of magnetic suspension systems 304. In addition, as used herein, nominal configuration is the relative positions or relationship between touch screen 302 and housing component 314 when no force is applied to either component. Stated another way, the nominal configuration may be considered an equilibrium or zero-force state of touch screen 302 and housing component 314.

Figure 7:
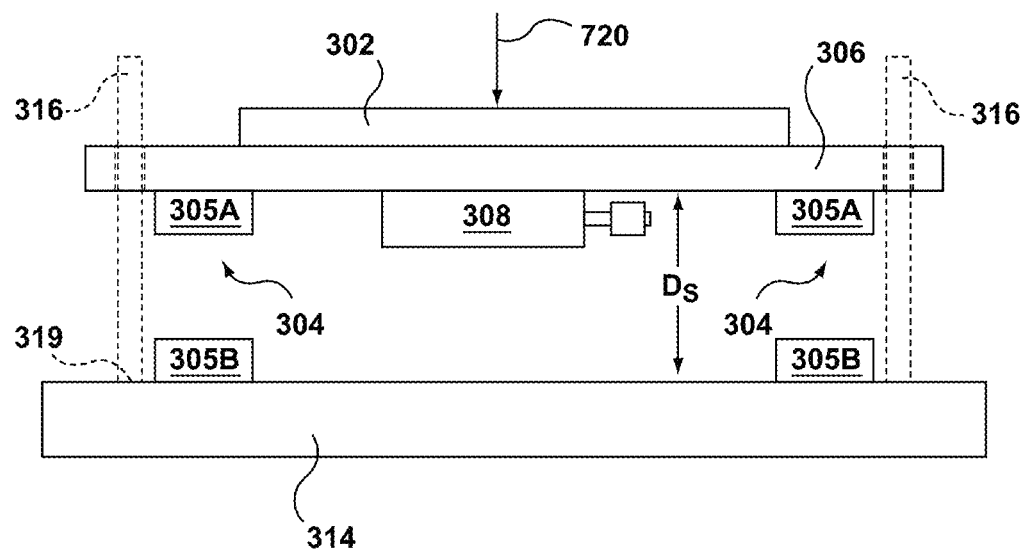
FIG. 7 is a side view of the haptic device of FIG. 3, wherein an actuator of the haptic device applies a downward force to the touch screen along the z-axis.
Figure 8:
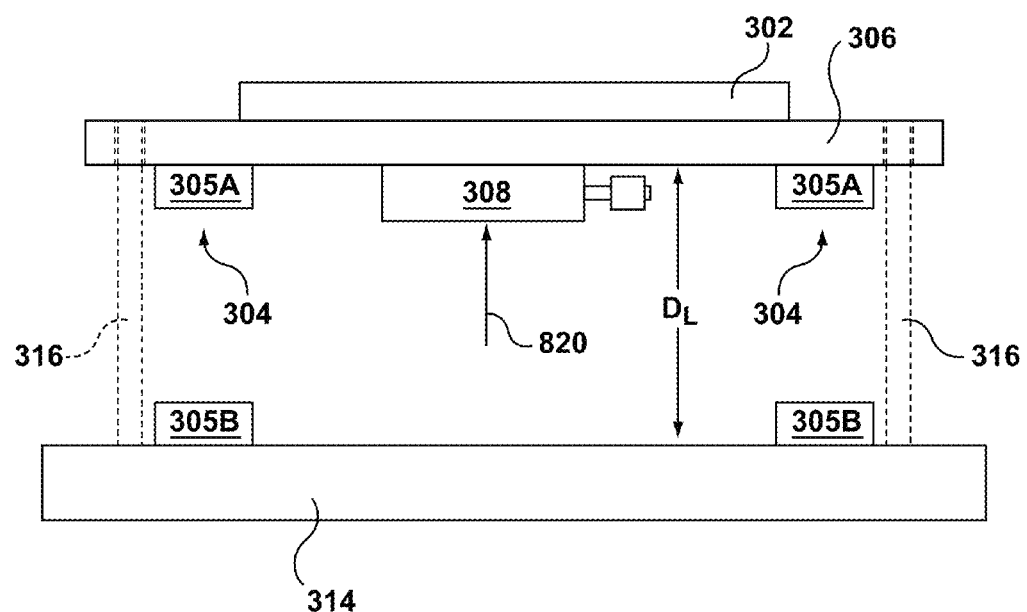
FIG. 8 is a side view of the haptic device of FIG. 3, wherein an actuator of the haptic device applies an upward force to the touch screen along the z-axis.

In the embodiment of FIG. 3, magnetic suspension systems 304 are configured or programmed to allow movement of touch screen 302 in the direction of the z-axis and to limit or restrict travel in the direction of the y-axis and x-axis. More particularly, touch screen 302 is permitted or allowed to move in opposing directions, i.e., upward and downward, along the z-axis of the magnetic suspensions systems. "Opposing directions" as used herein includes a pair of directions that extend or face away from each other, or extend or face in opposite ways that are 180 degrees from each other. However, when the user applies forces to touch screen 302 along either the x-axis in any direction or the y-axis in any direction, magnetic suspension systems 304 do not allow movement of touch screen 302 in these directions and as such the user feels as though touch screen 302 is rigidly mounted relative to housing component 314 of haptic device 300. When actuator 308 outputs a force along the z-axis, magnetic suspension systems 304 are programmed or configured to allow both upward and downward movement of touch screen 302 along the z-axis in order to provide haptic effects to the user. More particularly, when haptic actuator 308 outputs a force in a downward direction along the z-axis as indicated by directional arrow 720 on FIG. 7, magnetic suspension systems 304 allow downward movement of touch screen 302 such that the distance between touch screen 302 and housing component 314 is reduced or decreased to a shortened distance $D_S$. Shortened distance $D_S$ is less than the controlled or programmed distance $D_N$ shown in the nominal configuration of FIG. 3. When the downward force is no longer applied by haptic actuator 308, housing component 314 and touch screen 302 return to the nominal configuration due to the controlled or programmed spring force of magnetic suspension systems 304. Similarly, when haptic actuator 308 outputs a force in an upward direction along the z-axis as indicated by directional arrow 820 on FIG. 8, magnetic suspension systems 304 allow upward movement of touch screen 302 such that the distance between touch screen 302 and housing component 314 is increased to a longer distance $D_L$. Longer distance $D_L$ is greater than the controlled or programmed distance $D_N$ shown in the nominal configuration of FIG. 3. When the upward force is no longer applied by haptic actuator 308, housing component 314 and touch screen 302 return to the nominal configuration due to the controlled or programmed spring force of magnetic suspension systems 304. Thus, magnetic suspension systems 304 allow a user to feel vibrations, jolts, and similar tactile feedback produced by actuator 308 by permitting movement of the touch screen along the z-axis but also provide stability to touch screen 302 during user operation thereof by restricting or preventing movement of the touch screen along the x-axis and the y-axis.

In another embodiment hereof, magnetic suspension systems 304 are configured or programmed to such that downward movement of touch screen 302 along the z-axis, i.e., perpendicular to haptic device 300 and touch screen 302, is also restricted in addition to movement along the x-axis and along the y-axis. When a user presses down on touch screen 302 during operation thereof, magnetic suspension systems 304 are configured to limit or restrict movement of touch screen 302 relative to housing component 314 in a first direction along a translation axis of the device, which in this example is in the z-axis, so that the user feels as though touch screen 302 is rigidly mounted within housing component 314. However, in reaction to the force produced by actuator 308, magnetic suspension systems 304 are configured to allow movement of touch screen 302 relative to housing component 314 in a second or opposing direction along the z-axis. Thus, magnetic suspension systems is programmed to have different stiffnesses in opposing actuation directions in order to restrict movement or travel in a particular or first direction while still allowing for movement in a second or opposing direction. In an embodiment hereof, downward movement of touch screen 302 along the z-axis is not restricted or restricted as much as movement along the x-axis and along the y-axis. Downward movement of touch screen 302 along the z-axis is only restricted or limited enough to not feel like the touch screen is moving when pressed, but such downward movement is permitted or allowed during the vibration of the haptic effect. For example, first and second programmable magnets 305A, 305B may be configured such that less force is required to pull the programmable magnets apart than to push the programmable magnets together.

Figure 4:
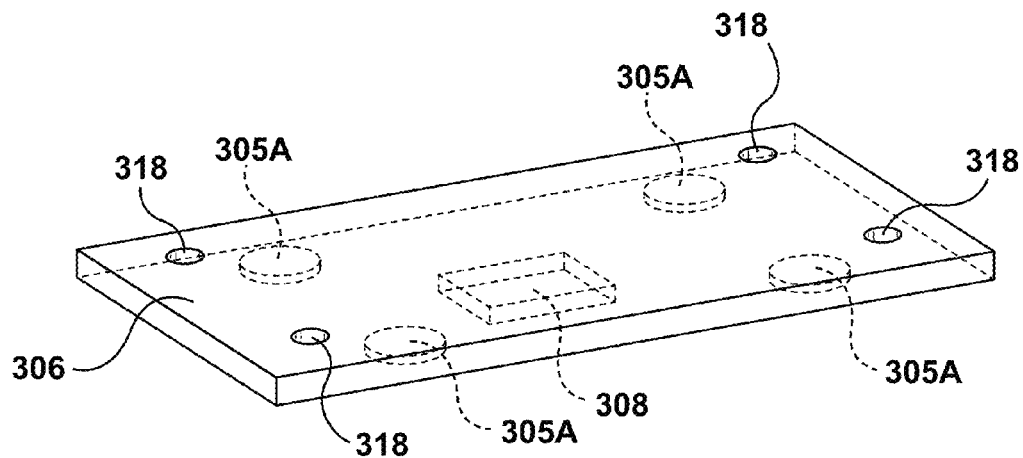
FIG. 4 is a perspective view of a carrier component of the haptic device of FIG. 3, the carrier component being removed from the haptic device for illustration purposes only.
Figure 5:
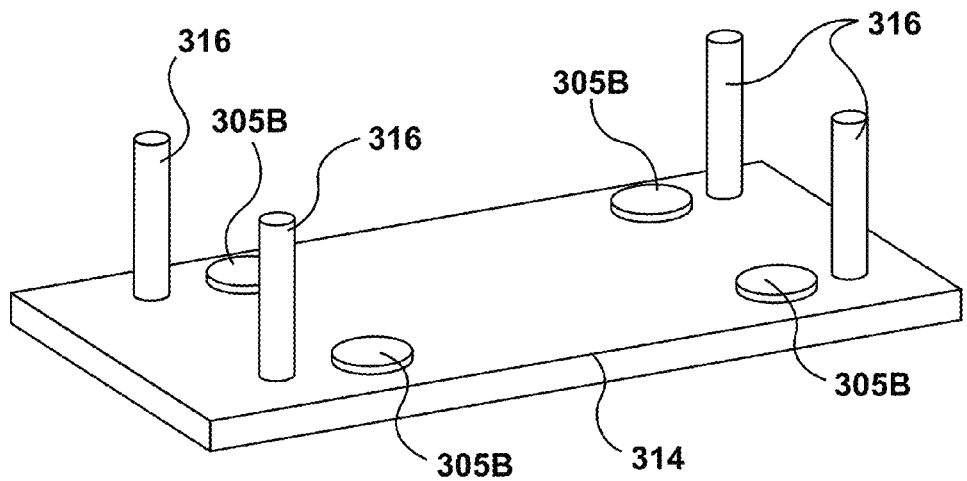
FIG. 5 is a perspective view of the housing component of the haptic device of FIG. 3 and a plurality of posts attached to the housing component, the housing component being removed from the haptic device for illustration purposes only.

In the embodiment of FIG. 3, haptic device 300 includes a plurality of guide rails or cylindrical posts 316 that are slidingly received through holes or openings 318 formed through mounting component 306 in order to provide haptic device 300 with stability during movement of touch screen 302. More particularly, with additional reference to FIG. 4 which shows a perspective view of mounting component 306 and FIG. 5 which shows a perspective view of housing component 314 and posts 316, each post 316 includes a first end 317 and a second or opposing end 319 that is fixed or attached to housing component 314. Posts 316 are sized to be positioned through corresponding openings 318 such that mounting component 306 (and touch screen 302 attached thereto) are slidingly disposed over posts 316. "Slidingly disposed" as used herein means that mounting component 306 (and touch screen 302 attached thereto) are disposed over posts 316 and are configured to slide or move relative to posts 316. When forces are output by actuator 308, mounting component 306 (and touch screen 302 attached thereto) is moved along the z-axis and the mounting component (and touch screen 302 attached thereto) slides up and down along posts 316 such that the posts serve as a track or guide for movement of the touch screen along the z-axis. In addition, in an embodiment hereof, openings 318 are sized only slightly larger than posts 316 in order to further limit or restrict side to side movement of touch screen 302 along the x-axis and/or along the y-axis. Thus, although posts 316 are not required components of the haptic device, posts 316 are configured to assist magnetic suspension systems 304 in restricting side-to-side movement of touch screen 302 along the x-axis and/or along the y-axis.

Figure 9:
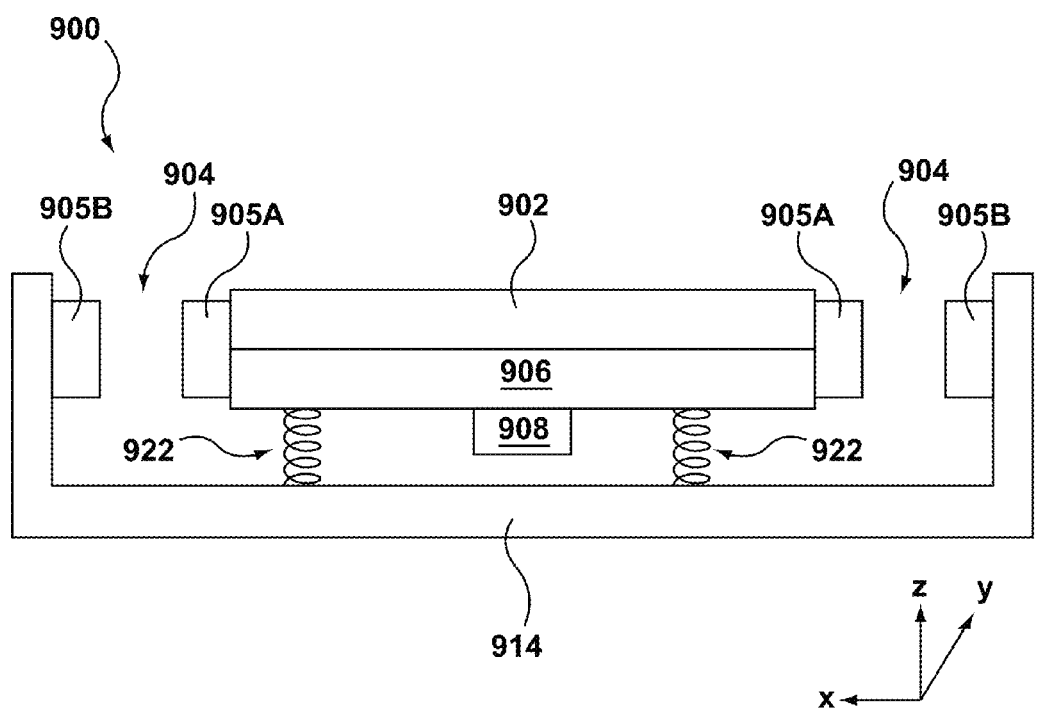
FIG. 9 is a side view of a haptic device according to another embodiment hereof, the haptic device including magnetic suspension systems for suspending a touch screen beside a housing component along the x-axis, wherein the magnetic suspension systems are shown in their nominal configurations with no force applied thereto.

Although magnetic suspension systems 304 are configured to allow preferential movement along the z-axis, magnetic suspension systems according to another embodiment hereof are configured to allow preferential movement in other directions of actuation, such as along the x-axis or the y-axis. More particularly, FIG. 9 is a side view of a haptic device 900 according to another embodiment hereof, the haptic device including magnetic suspension systems 904 for suspending a touch screen 902 beside or within a housing or base component 914 along the x-axis. Magnetic suspension systems 904 couple touch screen 902 and housing component 914 together such that the touch screen is movable relative to the housing component along the x-axis. Magnetic suspension systems 904 are shown in their nominal configurations with no force applied thereto. A carrier or mounting component 906 is coupled to an underside surface of touch screen 902. Similar to the embodiment of FIG. 3, each magnetic suspension system 904 includes a first programmable magnet 905A attached to touch screen 902 and a second programmable magnet 905B attached to housing component 914. First and second programmable magnets 905A, 905B are each programmable magnets including multiple magnetic elements of various strength and polarity on a single substrate.

In this embodiment, however, the forces produced or output by haptic actuator 908 onto touch screen 902 are linear and along the x-axis, parallel to the planar surface of the touch screen 902. First and second programmable magnets 905A, 905B are programmed to attract and repel each other with a programmed force at the same time such that touch screen 902 is "suspended" magnetically beside or within housing component 914 such that the touch screen floats beside or within the housing component with a programmed spring force or damping. As such, magnetic suspension systems in accordance with embodiments hereof are configured to or programmed such that touch screen 902 floats or hovers a controlled or programmed spaced-apart distance from housing component 914 in a nominal configuration shown in FIG. 9, while also being configured to allow movement between housing component 914 and touch screen 902 in reaction to a force applied to the touch screen by haptic actuator 908 with a controlled or programmed spring force such that housing component 914 and touch screen 902 return to the nominal configuration when no force is applied to touch screen 902. In the embodiment of FIG. 9, magnetic suspension systems 904 are configured or programmed to allow movement of touch screen 902 in the direction of the x-axis. Although not shown herein, magnetic suspension systems may be configured to allow preferential movement along the y-axis as well.

In the embodiment of FIG. 9, spring elements 922 are utilized as a mechanical suspension system in haptic device 900 to couple touch screen 902 to housing component 914 and allow touch screen 902 to be moved along the z-axis. Spring elements 922 are shown as helical or coiled elements, but may be a compliant material such as rubber, foam, or flexures. In another embodiment (not shown), another magnetic suspension system such as magnetic suspension system 304 may be utilized as a suspension system to couple touch screen 902 to housing component 914 and allow touch screen 902 to be moved along the z-axis. In yet another embodiment (not shown), magnetic suspension systems 904 that are configured or programmed to allow movement of touch screen 902 in the direction of the x-axis may also be programmed or configured to suspend or float touch screen 902 above the housing component 914 in the direction of the z-axis and allow movement of touch screen 902 in the direction of the z-axis.

In addition to touch screen surfaces, magnetic suspension systems such as those described above may be utilized in other haptic applications to magnetically suspend a moving component relative to a fixed housing component with a programmed spring force or damping. For example, magnetic suspension systems such as those described above may be utilized to magnetically suspend a user input device of a handheld gaming controller 1024 for a gaming system such as the one shown in FIGS. 10A-10B. However, those skilled in the art would recognize that the controller is merely an exemplary embodiment of a haptic peripheral and that haptic peripherals with other configurations, shapes, and sizes may be used such as, but not limited to, phones, personal digital assistants (PDA), tablets, computers, gaming peripherals, and other controllers for virtual reality systems known to those skilled in the art.

FIGS. 10A and 10B are different perspective views of controller 1024. A housing 1034 of controller 1024 is shaped to easily accommodate two hands gripping the device, either by a left-handed user or a right-handed user. Those skilled in the art would recognize that controller 1024 is merely an exemplary embodiment of a controller of similar shape and size to many "gamepads" currently available for video game console systems, and that controllers with other configurations of user input elements, shapes, and sizes may be used, including but not limited to controllers such as a Wii™ remote or Wii™ U Controller, Sony® SixAxis™ controller or Sony® Wand controller, an Xbox™ controller or similar controller, as well as controllers shaped as real life objects (such as tennis rackets, golf clubs, baseball bats, and the like) and other shapes. Controller 1024 includes several user input elements or manipulandums, including a joystick 1030, buttons 1032, and triggers 1036. As used herein, user input element refers to an interface device such as a trigger, button, joystick, or the like, which is manipulated by the user to interact with a host computer (not shown). Within housing 1034, controller 1024 may include one or more haptic actuators (not shown) to drive the user input elements as well as one or more general or rumble actuators 1026, 1028 coupled to housing 1034 in a location where a hand of the user is generally located. Such haptic actuators provide haptic feedback to the user relating to operation of the video game.

Figure 11:
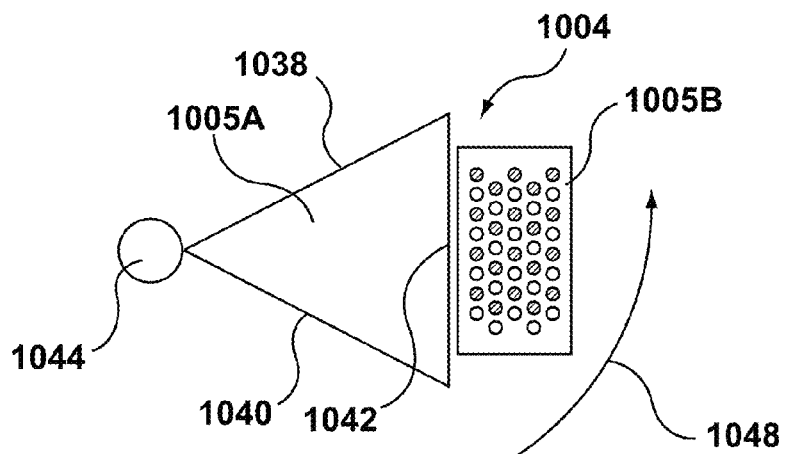
FIG. 11 is a side view of a magnetic suspension system to be utilized for suspending the trigger of the controller of FIGS. 10A and 10B.

Turning now to FIG. 11, magnetic suspension system 1004 to be utilized within controller 1024 will be described. Each magnetic suspension system 1004 includes a first programmable magnet 1005A (which when assembled is attached to trigger 1036 as will be described in more detail with respect to FIGS. 12-13) and a second programmable magnet 1005B which is a non-moving part housed within controller 1024. First and second programmable magnets 1005A, 1005B are each programmable magnets including multiple magnetic elements of various strength and polarity on a single substrate. First programmable magnet 1005A has a triangular configuration that includes a base face or surface 1042, as well as two opposing angular faces or surfaces 1038, 1040. As trigger 1036 is operated, first programmable magnet 1005A rotates or pivots around a pivot point 1044, which is formed between opposing angular surfaces 1038, 1040 thereof, as indicated by directional arrow 1048 shown on FIG. 11.

Figure 12:
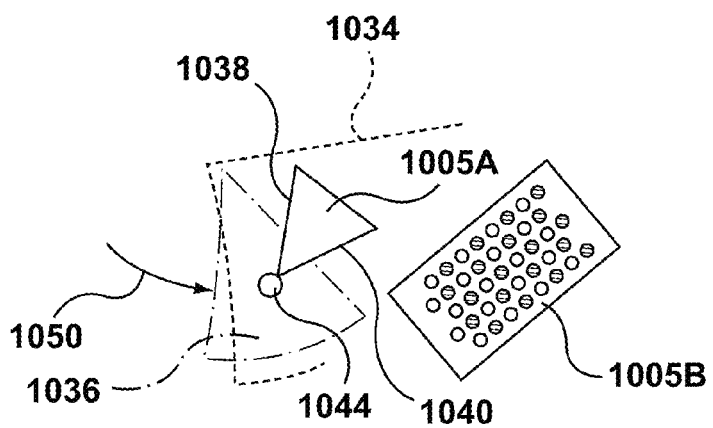
FIG. 12 is a side view of the magnetic suspension system of FIG. 11 utilized with the trigger of the controller of FIGS. 10A and 10B, wherein a downward force is applied to the trigger.
Figure 13:
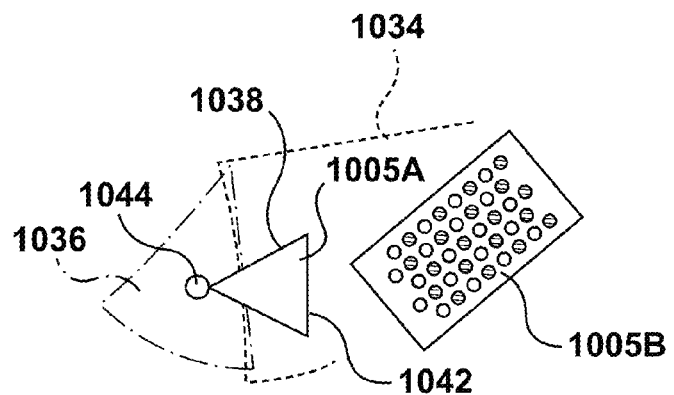
FIG. 13 is a side view of the magnetic suspension system of FIG. 11 utilized with the trigger of the controller of FIGS. 10A and 10B, wherein the magnetic suspension system is shown in its nominal configurations with no force applied thereto.

When magnetic suspension system 1004 is utilized within controller 1024, first programmable magnet 1005A is attached to trigger 1036 as shown FIGS. 12-13 and second programmable magnet 1005B is housed or positioned within controller 1024. FIGS. 12-13 are schematic illustrations of a portion of controller 1024 with housing 1034 removed (a portion of housing 1034 is shown in phantom) to illustrate the structural relationship between trigger 1024 and magnetic suspension system 1004. FIG. 13 illustrates a nominal configuration of magnetic suspension system 1004 and trigger 1024 in which no force is applied to trigger 1024. Trigger 1036 protrudes outside of or extends away from housing 1034, and base surface 1042 of first programmable magnet 1005A faces or opposes second programmable magnet 1005B. Base surface 1042 of first programmable magnet 1005A and second programmable magnet 1005B are programmed to attract and repel each other with a programmed force at the same time such that trigger 1024 is magnetically "suspended" in the nominal configuration with trigger 1024 protruding outside of or extending away from housing 1034 with a programmed spring force or damping. As such, magnetic suspension system 1004 in accordance with embodiments hereof are configured to or programmed such that first programmable magnet 1005A is suspended or positioned a controlled or programmed spaced-apart distance from second programmable magnet 1005B.

When a downward force is applied to trigger 1036 as indicated by directional arrow 1050 on FIG. 12, trigger 1036 and first programmable magnet 1005A attached thereto rotate or pivot around pivot point 1044 until angular surface 1040 of first programmable magnet 1005A faces or is adjacent to second programmable magnet 1005B as shown in FIG. 12. The downward force applied to trigger 1036 may be user-applied (e.g., trigger 1036 is manually rotated with respect to housing 1034 and the trigger is pressed into the controller housing by the user during video game operation to input user action) or may be applied by a haptic actuator (not shown) housed within controller 1024 for providing haptic effects to the user during video game operation. Angular surface 1040 and/or angular surface 1038 of first programmable magnet 1005A are programmed to attract second programmable magnet 1005B. When the downward force represented by directional arrow 1050 is removed from trigger 1036, the attraction force between angular surface 1040 and/or angular surface 1038 of first programmable magnet 1005A and second programmable magnet 1005B causes first programmable magnet 1005A (and trigger 1036 attached thereto) to move towards second programmable magnet 1005B, thereby causing first programmable magnet 1005A (and trigger 1036 attached thereto) to return to their nominal configuration shown in FIG. 13. The attraction force between angular surface 1040 and/or angular surface 1038 of first programmable magnet 1005A and second programmable magnet 1005B thus essentially is a controlled or programmed spring force such that trigger 1036 returns to the nominal configuration when no force is applied thereto.

Figure 14:
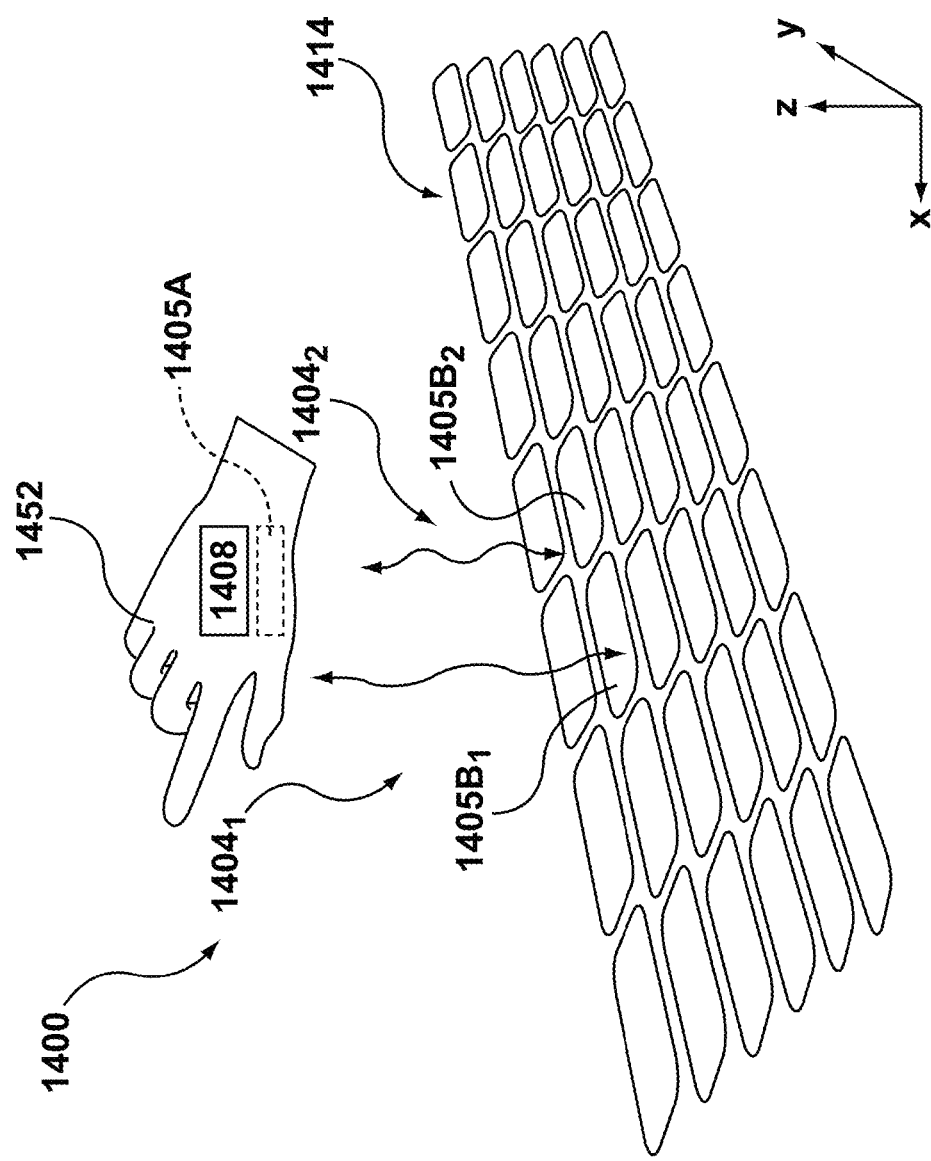
FIG. 14 is a perspective view illustration of a haptic device according to another embodiment hereof, the haptic device being a wearable component including a magnetic suspension system for suspending the wearable component above a fixed base component along the z-axis.

In another embodiment hereof, magnetic suspension systems such as those described above are utilized in a wearable haptic application to magnetically suspend a wearable haptic actuator relative to a fixed base component with a programmed spring force or damping. More particularly, FIG. 14 is a perspective view illustration of a haptic system 1400 including a haptic device 1452 according to another embodiment hereof, the haptic device being a wearable component that utilizes at least one magnetic suspension system for suspending the wearable component above a fixed base component 1414 along the z-axis. Wearable haptic device 1452 includes at least a first programmable magnet 1405A and a haptic actuator 1408 attached thereto for producing haptic effects. In the embodiment of FIG. 14, fixed base component 1414 includes a plurality of second programmable magnets $1405B_1$, $1405B_2$ which each form or create an individual or discrete magnetic suspension system $1404_1$, $1404_2$, respectively, with programmed or programmed characteristics. Programmable magnets 1405A, $1405B_1$, $1405B_2$ are each programmable magnets including multiple magnetic elements of various strength and polarity on a single substrate.

More particularly, each magnetic suspension system includes first and second programmable magnets that are programmed to attract and repel with a programmed force at the same time such that wearable haptic device 1452 is "suspended" magnetically above fixed base component 1414 such that the wearable haptic device floats above the fixed base component with a programmed spring force or damping. As such, magnetic suspension systems in accordance with embodiments hereof are configured or formed to such that wearable haptic device 1452 floats or hovers a controlled or programmed spaced-apart distance from fixed base component 1414 in a nominal configuration shown in FIG. 14, while also being configured to allow movement between fixed base component 1414 and wearable haptic device 1452 in reaction to a force applied to the wearable haptic device by haptic actuator 1008 with a controlled or programmed spring force such that fixed base component 1414 and wearable haptic device 1452 return to the nominal configuration when no force is applied to the wearable haptic device.

As wearable haptic device 1452 is moved or translated over fixed base component 1414, a magnetic suspension system is formed between first programmable magnet 1405A (attached to the wearable haptic device) and whichever second programmable magnet opposes or faces first programmable magnet 1405A. Each magnetic suspension system $1404_1$, $1404_2$ is configured to have pre-programmed patterns of suspension and spring force characteristics. For example, in an embodiment, when first programmable magnet 1405A is positioned to oppose or face second programmable magnet $1405B_1$, magnetic suspension system $1404_1$ is programmed to suspend wearable haptic device 1452 a first controlled or programmed spaced-apart distance from fixed base component 1414 and is programmed to allow movement between wearable haptic device 1452 and fixed base component 1414 in reaction to a force applied to the wearable component by haptic actuator 1008 with a first controlled or programmed spring force. When first programmable magnet 1405A is positioned to oppose or face second programmable magnet 1405B$_2$, magnetic suspension system 1404$_2$ is programmed to suspend wearable haptic device 1452 a second controlled or programmed spaced-apart distance from fixed base component 1414 and is programmed to allow movement between wearable haptic device 1452 and fixed base component 1414 in reaction to a force applied to the wearable component by haptic actuator 1008 with a second controlled or programmed spring force. The first and second controlled or programmed spaced-apart distances may be different values or may be the same, depending upon application, and the first and second controlled or programmed spring force may be different values or may be the same, depending upon application. Although only two individual or discrete magnetic suspension system 1404$_1$, 1404$_2$ are described herein, it will be understood by one of ordinary skill in the art that haptic system 1400 may utilize any number of magnetic suspension systems and the magnetic suspension systems may be configured or programmed with the same characteristics or with different characteristics as described above.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A haptic device comprising:
    a first body and a second body;
    a haptic actuator for moving the second body relative to the first body and thereby provide a haptic effect; and
    at least one magnetic suspension system that couples the first and second bodies together such that the second body is movable relative to the first body, the at least one magnetic suspension system including a first programmable magnet coupled to the first body and a second programmable magnet coupled to the second body,
    wherein the first and second programmable magnets are configured to simultaneously repel and attract each other in a nominal configuration such that the second body is suspended a programmed spaced-apart distance from the first body, and
    wherein the first and second programmable magnets are also configured to exert a programmed spring force on the second body in a first direction when the second body has moved in a second direction opposite the first direction past the nominal configuration, and are configured to exert the programmed spring force on the second body in the second direction when the second body has moved in the first direction past the nominal configuration, such that the first and second bodies return to the nominal configuration when no other force is applied to the second body.

2. The haptic device of claim 1, wherein the second body includes a touch screen or touch surface component that is attached to the haptic actuator.

3. The haptic device of claim 2, wherein the first direction is a direction in which the touch screen or the touch surface component is moved closer to the first body, and the second direction is a direction in which the touch screen or the touch surface component is moved farther from the first body.

4. The haptic device of claim 3, wherein movement of the second body in the second direction is less restricted by the at least one magnetic suspension system than movement of the second body in the first direction.

5. The haptic device of claim 4, wherein the first programmable magnet and the second programmable magnet of the at least one magnetic suspension system are configured such that less force is required to pull apart the first programmable magnet and the second programmable magnet than that required to push together the first programmable magnet and the second programmable magnet.

6. The haptic device of claim 5, wherein the at least one magnetic suspension system comprises four magnetic suspension systems disposed at respective corners of the haptic device.

7. The haptic device of claim 1, wherein the second body includes a user input device of a peripheral.

8. The haptic device of claim 7, wherein the user input device is a trigger.

9. The haptic device of claim 1, wherein the first direction and the second direction extend along an axis of the at least one magnetic suspension system.

10. The haptic device of claim 9, wherein the axis is the z-axis.

11. The haptic device of claim 1, further comprising: at least one post extending between the first and second bodies, the second body including an opening sized to receive the post such that the second body is slidingly disposed over the post.

12. The haptic device of claim 11, wherein the opening is sized only slightly larger than the post in order to restrict movement between the first and second bodies in at least the second direction, the first direction and the second direction extending along first and second axes, respectively, of the magnetic suspension system.

13. The haptic device of claim 1, wherein the second body includes a wearable component that is attached to the haptic actuator.

14. A haptic device comprising:
    a housing component;
    a touch screen;
    a haptic actuator for moving the touch screen relative to the housing component and thereby provide a haptic effect; and
    at least one magnetic suspension system that couples the touch screen and the housing component together such that the touch screen is movable relative to the housing component, the at least one magnetic suspension system including a first programmable magnet coupled to the housing component and a second programmable magnet coupled to the touch screen,
    wherein the first and second programmable magnets are configured to simultaneously repel and attract each other in a nominal configuration such that the touch screen is suspended a programmed spaced-apart distance from the housing component, and wherein the first and second programmable magnets are also configured to exert a programmed spring force on the touch screen in a first direction when the touch screen has moved in a second direction opposite the first direction past the nominal configuration, and are configured to exert the programmed spring force on the touch screen in the second direction when the touch screen has moved in the first direction past the nominal configuration, such that the touch screen and housing component return to the nominal configuration when no force is applied to the touch screen.

15. The haptic device of claim 14, further comprising: at least one post extending between the housing component and touch screen, the touch screen including an opening sized to receive the post such that the touch screen is slidingly disposed over the post.

16. The haptic device of claim 15, wherein the opening is sized only slightly larger than the post in order to restrict movement between the housing component and touch screen in at least the second direction, the first direction and the second direction extending along first and second axes, respectively, of the magnetic suspension system.

17. The haptic device of claim 14, wherein the first direction and the second direction extend along the z-axis of the magnetic suspension system.

* * * * *